(12) United States Patent
Atmur

(10) Patent No.: US 6,906,481 B1
(45) Date of Patent: Jun. 14, 2005

(54) POWER SHARING HIGH FREQUENCY MOTOR DRIVE MODULAR SYSTEM

(75) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/727,843

(22) Filed: Dec. 3, 2003

(51) Int. Cl.[7] .............................................. H02K 23/00
(52) U.S. Cl. ...................... 318/254; 318/801; 318/798
(58) Field of Search ................................ 318/254, 138, 318/439, 798, 800, 801, 802, 811, 812; 363/132

(56) References Cited

U.S. PATENT DOCUMENTS

| | | | |
|---|---|---|---|
| 5,291,194 A | | 3/1994 | Ames |
| 5,491,622 A | * | 2/1996 | Carosa .................... 363/56.02 |
| 5,646,366 A | | 7/1997 | O'Connell |
| 5,748,102 A | | 5/1998 | Barron |
| 6,185,118 B1 | * | 2/2001 | Sander et al. ............... 363/132 |
| 6,331,759 B1 | | 12/2001 | Atmur |
| 6,482,054 B2 | | 11/2002 | Treaster et al. |
| 6,536,365 B1 | | 3/2003 | Horton |
| 6,600,695 B1 | | 7/2003 | Nugent et al. |
| 6,642,683 B1 | | 11/2003 | Atmur |
| 2003/0001538 A1 | | 1/2003 | Atmur |
| 2003/0103771 A1 | | 6/2003 | Atmur et al. |
| 2003/0218438 A1 | | 11/2003 | Atmur |

OTHER PUBLICATIONS

Helduser, S., and Bonefeld, R., *Active Damping in Civil Engineering Using Hydraulic Actuators*, Institute of Fluid Power and Motion control, Dresden University of Techmology, Germany.

Stekl, Petr, and Kubiczek, Zdenek, *Low–Cost, 3–Phase, AC Motor Control System with Power Factor Correction Based on MC68HC908MR32*, Motorola Czech System Application Laboratory, Roznov pod Radhostem, Czech Republic, 2001.

De Mendonca, R.G., Neto, L. Martins, Camacho, J.R., *The Oscillating Torque On A Three–Phase Induction Generator Connected To A Single–Phase Distribution System*, Electrical Machines Laboratory, Electrical Engineering Department Universidade Federal de Uberlandia, Brazil.

Visinka, Radim, *Low Cost 3–Phase AC Motor Control System Based on MC68HC908MR24*, Roznov System Application Laboratory, Motorola, Czech Republic, 1998.

Brushless DC (BLDC) Motor, [online]. Retrieved from Internet: <URL: www.motorola.com/webapp/sps/site/overview>.

3–Phase AC Induction Motor, [online], Retrieved from Internet: <URL: www.motorola.com/webapp/sps/site/overview>.

* cited by examiner

*Primary Examiner*—Karen Masih
(74) *Attorney, Agent, or Firm*—Ingrassia Fisher & Lorenz, P.C.

(57) ABSTRACT

Methods and apparatus are provided for frequency and power scaling a drive assembly for a brushless direct current (BLDC) motor. The apparatus comprises multiple groups of half-bridge switching element assemblies connected to respective "In-Hand" phase windings of the BLDC. Each group of half-bridge assemblies receives time sliced commands from a processor so that the resultant frequency of the output drive signal can be higher than the frequency capability of an individual switching element. By effectively paralleling groups of half-bridge assemblies connected to respective In-Hand phase windings, the current delivered to the phase windings can be greater than the individual current capability of the switching elements in the half-bridge assemblies. The electromagnetic field generated in the "In-Hand" phase windings forces essentially equal current sharing in the respective driver switching elements. The disclosed techniques enable frequency and power scaling of motor drive assemblies using standard low-cost components.

14 Claims, 9 Drawing Sheets

POWER SHARING HIGH FREQUENCY MOTOR DRIVE MODULAR SYSTEM

TECHNICAL FIELD

The present invention generally relates to methods and devices for controlling an electric motor, and more particularly relates to a controller and associated drive assembly for controlling a brushless direct current (BLDC) motor.

BACKGROUND

Electric motors are used in many application areas, such as utilities, manufacturing, military, medicine, transport, and so forth. One type of electric motor in general use is known as a brushless direct current (BLDC) motor. In a BLDC motor, the stationary outside portion (stator) is typically composed of electromagnetic windings corresponding to the electrical phase configuration of the motor, and the rotating inner portion (rotor) is typically composed of two or more permanent magnets of opposite magnetic polarity. The stator windings are generally electrically connected to a controller/driver unit, where the controller typically provides commands to the driver to generate poly-phase input currents in the stator windings. A BLDC motor driver does not require brushes or a commutator, and is therefore relatively maintenance-free, with a typically lower level of generated electrical noise.

One conventional type of BLDC motor driver includes a series of Insulated Gate Bipolar Transistors (IGBT's) electrically connected to the phase windings of the BLDC motor. For a three-phase BLDC motor, a conventional driver typically includes six IGBT's arranged in three half-bridges, where each half-bridge can generate a drive for one phase of the motor. As the rotor permanent magnets approach the stator electromagnetic windings of opposed polarity, sensors are typically used to signal the angular position of the rotor to the controller, which can then command the driver to cause the input currents in the stator windings to switch their magnetic field polarities. In this manner, a rotating magnetic field can be generated by the current flows through the stator windings. For a three-phase motor, the three current phases are typically switched in sequence, as dictated by the angular position of the rotor.

The speed of a BLDC motor is generally controlled by a pulse width modulation (PWM) technique, where the driver controls the average currents in the stator windings by generating "on" and "off" states for the input voltage signals to the stator windings. That is, the duty cycle of the input voltage pulse signals can be used as a controlling factor for the average current in the stator windings.

The upper speed capability of a conventional BLDC motor driver is typically limited to the switching speed of the IGBT elements in the half-bridge circuits used to drive the stator windings. For example, a standard driver with six IGBT's can typically drive a three-phase motor, using two IGBT's per phase, with a maximum switching frequency of approximately 20 kHz, assuming. The maximum IGBT current is not required for more than a few minutes. As such, conventional BLDC motor drivers using IGBT switching elements are generally limited to relatively low frequency (about 20 kHz maximum) and low power (about one horsepower maximum) applications.

While other switching devices with higher frequency capabilities are available, their cost is typically many times' higher than the cost of a standard IGBT, which makes the costly high frequency devices generally undesirable for production applications. Furthermore, as motor technology advances, there is an increasing demand for drivers that are capable of operating at higher frequencies and higher power levels. For example, there are current applications requiring an operating frequency in the range of 62.5 kHz, with power levels ranging from approximately 2 to 21 horsepower. Therefore, there is a need for a scalable type of driver to operate over a range of frequencies and power levels. Moreover, this type of scalable driver could be suitable for production applications if the switching elements were standard low-cost components, such as IGBT's.

Accordingly, it is desirable to provide a controller/driver for BLDC motor applications with scalable frequency and power capabilities. In addition, it is desirable to implement the scalable driver with low-cost components for production applications. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for scaling a BLDC motor control system in both frequency and power. One control system embodiment includes a drive assembly in electrical communication with the phase windings of a BLDC motor, where the drive assembly contains a plurality of half-bridge assembly groupings. Each half-bridge assembly grouping is made up of half-bridge assemblies containing switching elements capable of operating at a first frequency and a first current level. The control system typically includes a processor in electrical communication with the drive assembly, where the processor is configured to control the operation of the switching elements in the half-bridge assemblies. Each grouping of the half-bridge assemblies is typically configured to generate pulse-width-modulated (PWM) signals into a respective phase winding of the BLDC motor at a second frequency that is higher than the first frequency. In addition, multiples of the half-bridge assembly groupings can be configured to generate a second current level in their corresponding phase windings that is greater than the first current level.

The second (composite) frequency of the PWM signal into a phase winding is generally equal to the product of the first frequency and the number of half-bridge assemblies in a grouping electrically connected to the phase winding. Similarly, the second (composite) current level of the PWM signal into a phase winding is generally equal to the product of the first current level and the number of multiple groupings of half-bridge assemblies in electrical communication with the phase winding.

The multiple groupings of half-bridge assemblies are typically connected to corresponding multiple "IN_AND" windings for each phase. The "IN_HAND" windings are generally made up of two or more approximately identical coils wrapped around the same phase winding core. As a result, the common electromagnetic field around the "IN_HAND" windings has the effect of forcing approximately equal current sharing between the switching elements of the corresponding half-bridge assemblies.

A particular benefit of the disclosed exemplary embodiments of a BLDC motor control system is that both frequency and power scaling can be achieved with standard low cost switching elements, such as insulated gate bipolar transistors (IGBT's). This benefit is due to the exemplary frequency and power sharing circuit configurations of the half-bridge assemblies described herein.

One exemplary method of scaling both frequency and power in a BLDC motor controller comprises the steps of:
  a) sequentially activating a grouping of half-bridge assemblies in the controller driver to generate an output signal to a respective phase winding of the BLDC motor at a frequency greater than the frequency capability of a single one of the half-bridge assemblies;
  b) combining a plurality of half-bridge assembly groupings in the controller driver to generate an output current level into respective phase windings that is greater than the current capability of a single one of the half-bridge assembly groupings; and
  c) equalizing the current share in each of the half-bridge assembly groupings by forcing current sharing in the respective phase windings.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of scaling the frequency and power capabilities of controller/drivers for BLDC motors. Combining multiple configurations of half-bridge assembly groupings in the controller/drivers enables the composite output frequency and power levels of the controller/drivers to exceed the limitations of the individual components used in the driver half-bridge assemblies. As such, the frequency and power scalability of the controller/drivers can be achieved with standard low-cost components.

Figure 1:
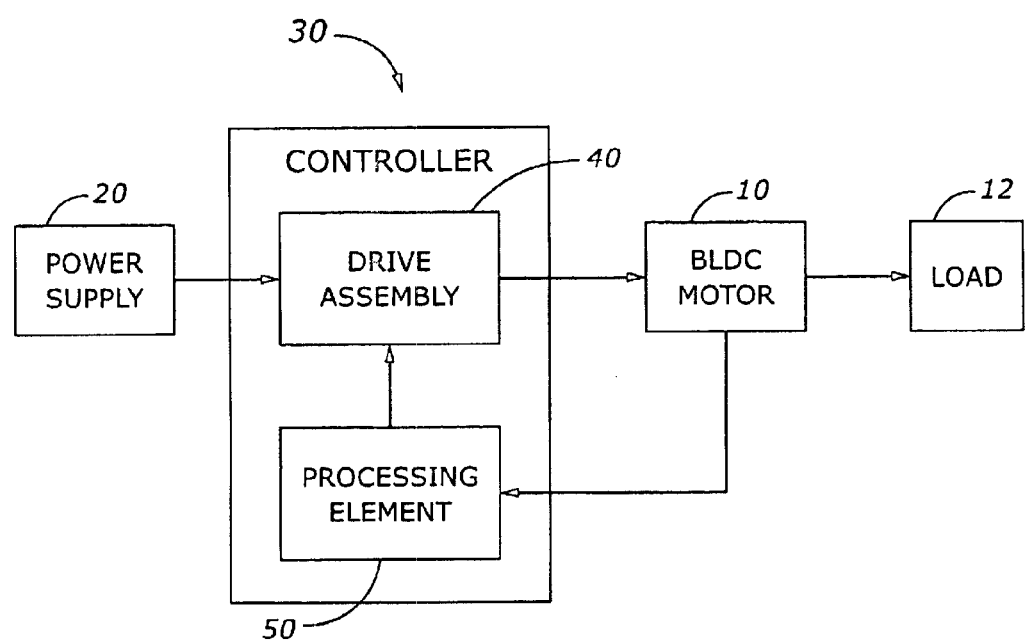
FIG. 1 is a block diagram of an exemplary control system for a BLDC motor.

According to an exemplary embodiment of a system for controlling a BLDC motor 10 connected to a load 12, as shown in FIG. 1, a controller 30 provides drive signals to motor 10 and receives feedback signals from motor 10. Controller 30 includes a drive assembly 40 in electrical communication with a processing element 50, which maybe any type of microprocessor, microcontroller, or other computing device capable of executing instructions in any computing language. A conventional power supply 20 provides power for the various components of controller 30.

Drive assembly 40 typically receives DC power from power supply 20, and is generally configured to produce pulse-width-modulated (PWM) output signals to BLDC motor 10. The PWM signals typically develop an average current relationship in BLDC motor 10, as is known in the art. In order to maintain an appropriate PWM input to BLDC motor 10, processing element 50 typically receives feedback from BLDC motor 10, consisting of rotor magnetic field orientation information obtained from such devices as magnetic field sensors (e.g., Hall Effect Sensors) or position sensors (e.g., encoders or resolvers).

Figure 2:
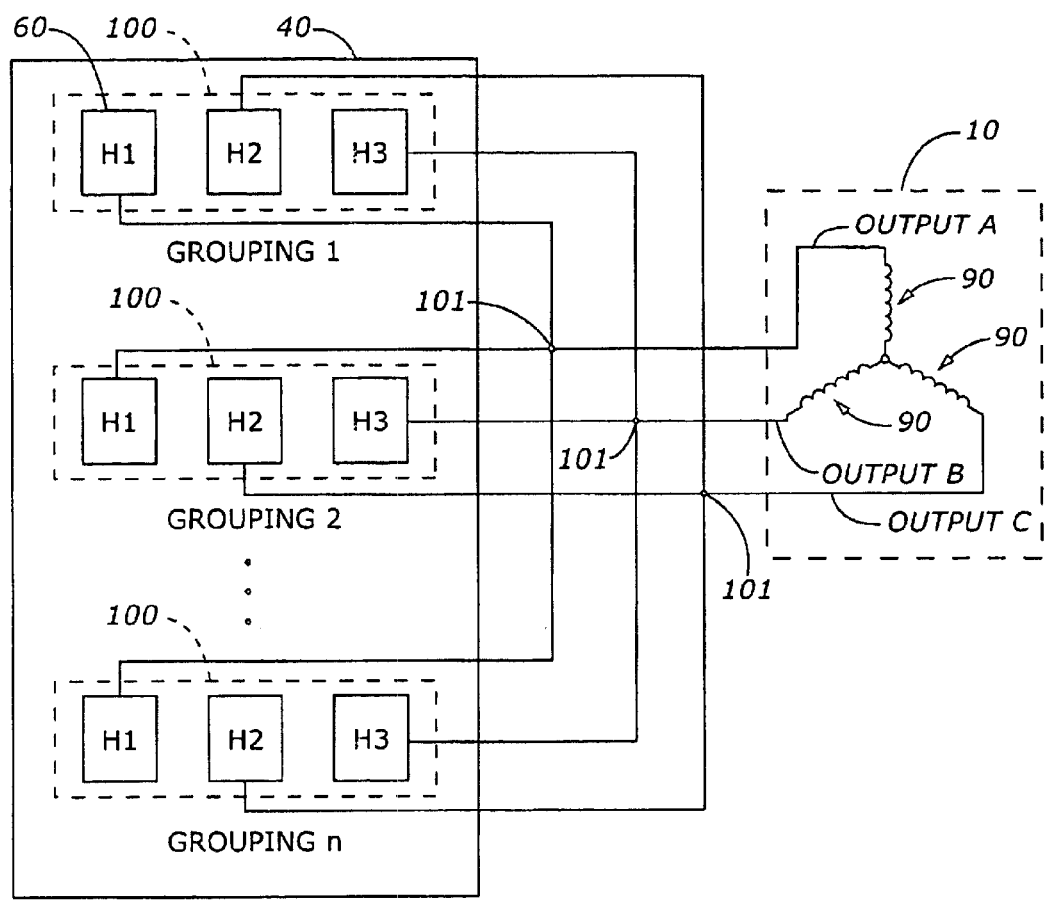
FIG. 2 is a schematic diagram of an exemplary drive assembly for a BLDC motor.

An exemplary embodiment of a frequency scaled driver configuration is shown in FIG. 2. In this embodiment, BLDC motor 10 is configured as a three-phase motor, with phase windings 90 corresponding to each phase. However, BLDC motor 10 can be configured with any number of phases and corresponding phase windings without departing from the spirit and scope of the present invention.

Drive assembly 40 is shown with n groupings 100 of half-bridge assemblies 60 (H1, H2, H3) in FIG. 2. In this embodiment, each designated grouping 1 through n is connected to each phase winding 90. In order to accomplish frequency scaling, as will be described below, three half-bridge assemblies 60 are included in each grouping 100, with designations H1, H2, H3. Each half-bridge assembly 60 is shown connected to a respective output node 101 that is connected to its respective phase winding 90. In the FIG. 2 example, half-bridge assemblies 60/H1 from each grouping 100 are connected to node 101 of output A, half-bridge assemblies 60/H2 from each grouping 100 are connected to node 101 of output C, and half-bridge assemblies 60/H3 from each grouping 100 are connected to node 101 of output B.

Figure 3:
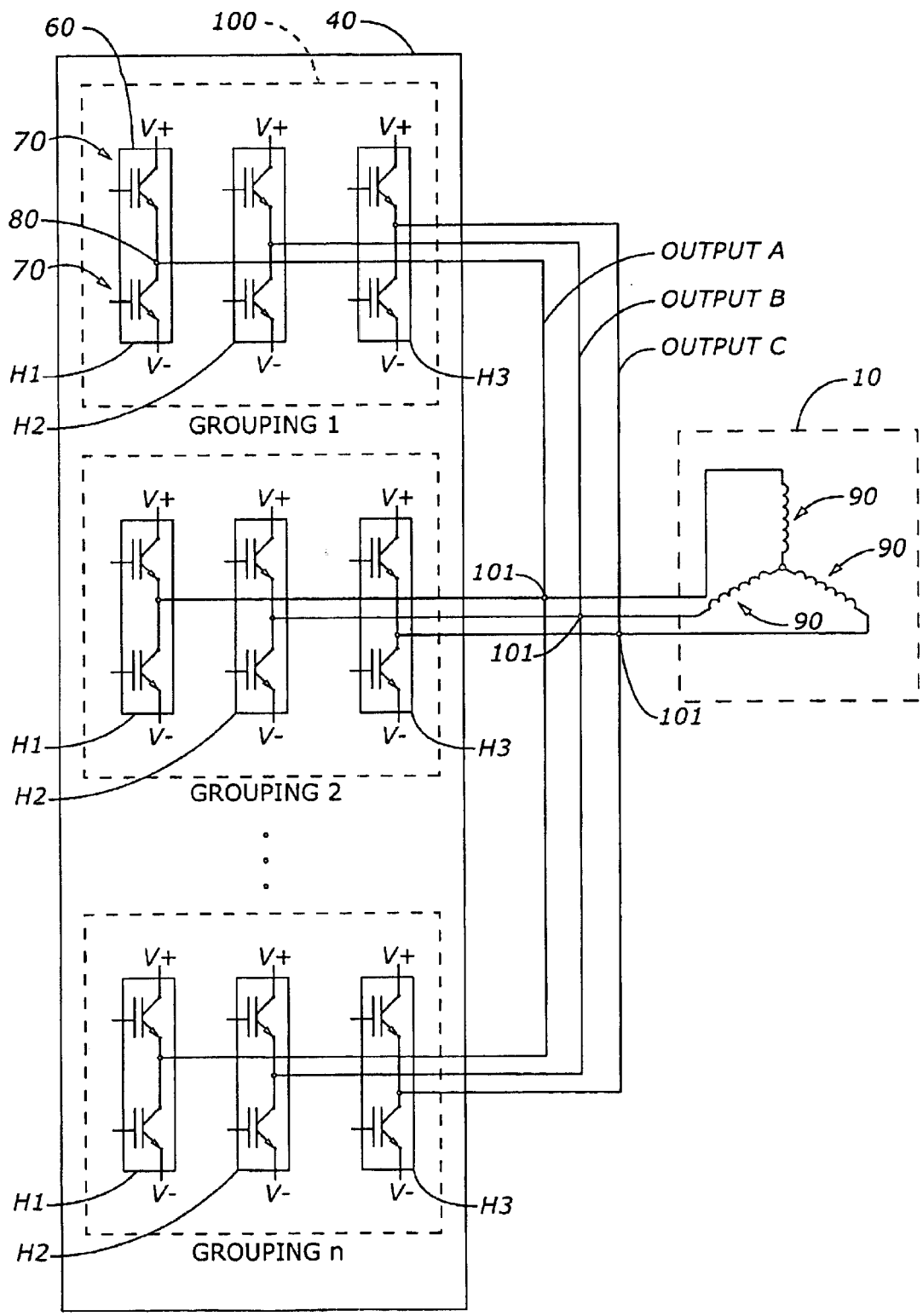
FIG. 3 is a schematic diagram of an exemplary switching element configuration for a BLDC motor drive assembly.

Another exemplary embodiment of drive assembly 40 is shown schematically in FIG. 3. In this embodiment, half-bridge assemblies 60 are arranged in a slightly different manner than in FIG. 2. That is, H-1 is connected to output A, H-2 is connected to output B, and H-3 is connected to output C. Other wiring configurations may also be used, as will be described later, without departing from the spirit and scope of the present invention.

In the exemplary embodiment shown in FIG. 3, each half-bridge assembly 60 includes two switching elements 70 connected in series, with a node 80 between the switching elements. Insulated gate bipolar transistors (IGBT's) are typically used as switching elements in this type of application, and are generally available at a relatively low cost. As indicated in FIG. 3, the collector and emitter of each IGBT switching element are electrically connected to power supply 20 (FIG. 1), and the gate of each IGBT is electrically connected to processing element 50 (FIG. 1). The gate connections are not shown for clarity. In addition, each half-bridge assembly 60 of FIG. 3 can further include any one of a number of other electrical components, as is known in the art. For example, each switching element 70 of each half-bridge assembly 60 can be electrically connected to a fast recovery epitaxial diode (FRED).

Each switching element 70 can operate at a frequency that does not exceed a predetermined maximum switching frequency, which is typically based on its maximum allowable power dissipation value. For example, when the switching elements comprise IGBT's, each switching element is typically limited to a maximum operating frequency of approximately 20 kHz. In a conventional BLDC driver, only one half-bridge assembly 60 is typically connected to each output node 101, such that only one half-bridge assembly 60 is electrically connected to each phase winding 90 of BLDC motor 10. In this type of standard configuration, the maximum output frequency of a driver using IGBT's will generally be limited to approximately 20 kHz, as previously noted. In order to achieve higher output frequencies with the same type of low-cost switching elements, a plurality of half-bridge assemblies can be used, as indicated by the groupings of three half-bridge assemblies (H-1, H-2, H-3) in FIGS. 2 and 3.

Figure 4:
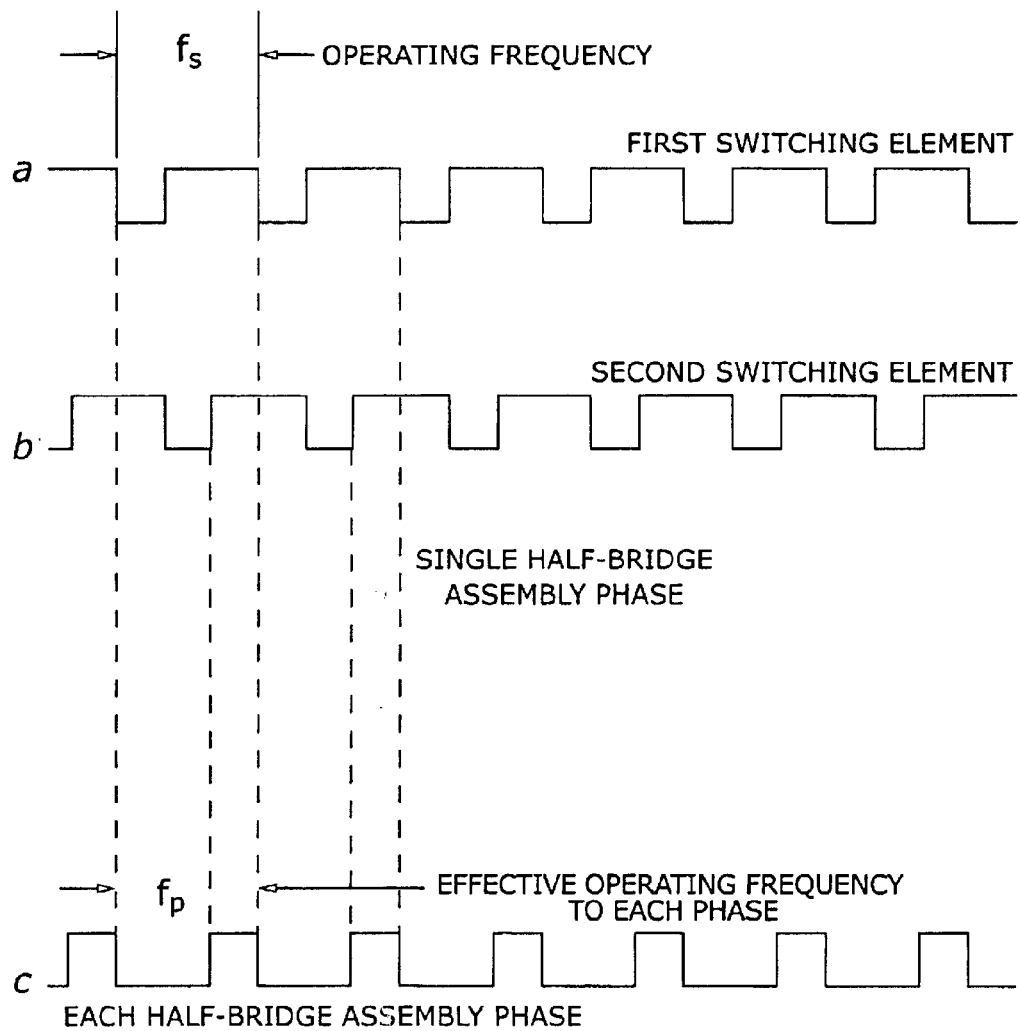
FIG. 4 is a timing diagram of an exemplary switching element configuration for a BLDC motor drive assembly.

FIG. 4 illustrates a timing diagram of the two switching elements 70 of a single half-bridge assembly 60 connected to a respective phase winding 90 of a conventional three-phase BLDC motor 10, with each switching element 70 operating at a frequency $f_s$. As illustrated, the first and second switching elements 70 are typically operated in the "on" and "off" states during the same frequency period ($f_s$), with the second switching element switched in a staggered manner with respect to the first switching element, as shown in timing diagrams a and b. Thus, each half-bridge assembly 60 is generally capable of providing a PWM output to its respective phase winding 90, as shown in timing diagram c, at a frequency $f_p$, that does not exceed, and is generally equal to, the operating frequency $f_s$ of each switching element 70.

Figure 5:
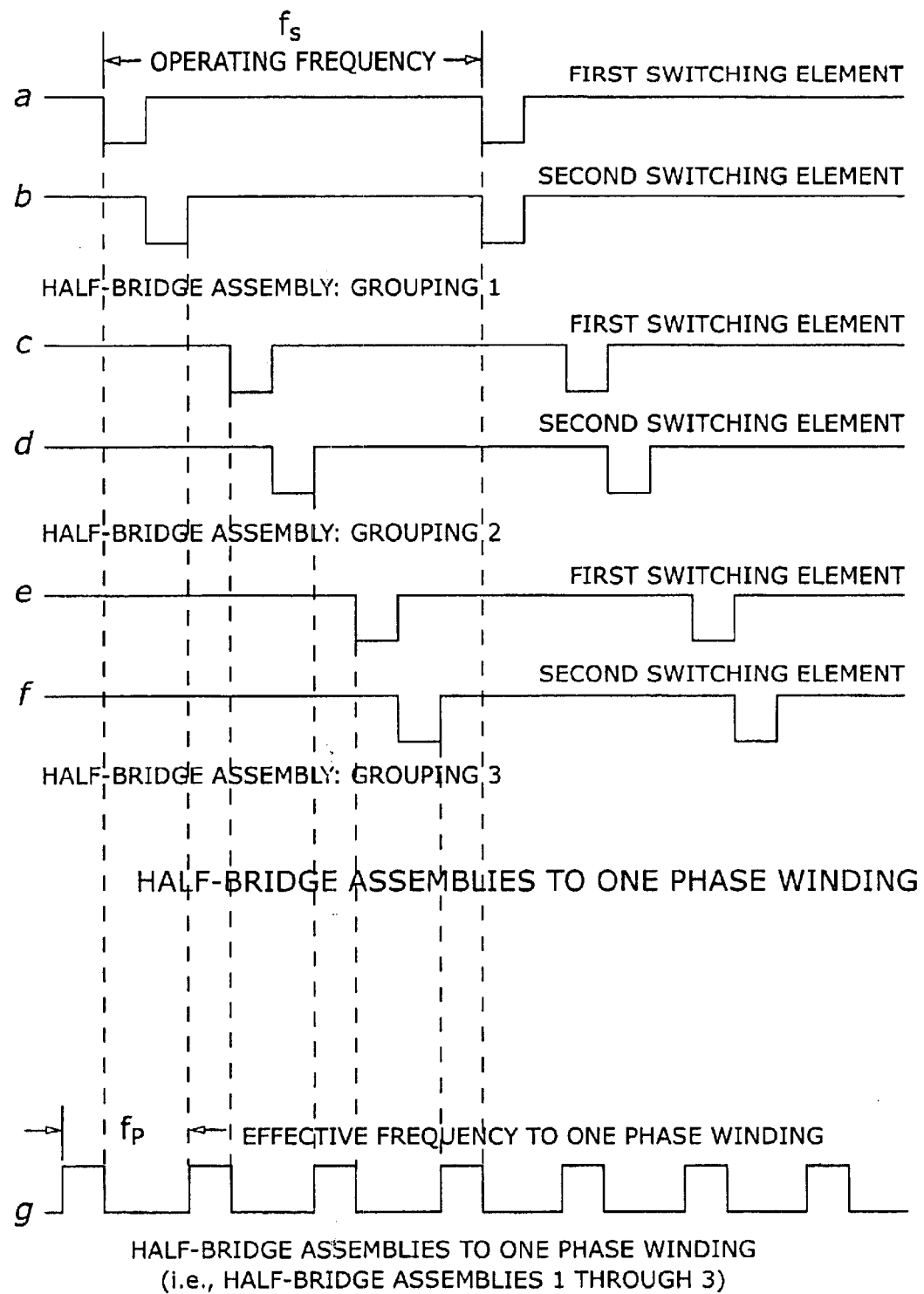
FIG. 5 is a timing diagram of an exemplary composite switching element configuration for a BLDC motor drive assembly.

The exemplary embodiments of FIGS. 2 and 3 disclosed herein provide a plurality of groupings of half-bridge assemblies 60 that are configured to produce a composite scaled frequency output to each phase winding 90, as illustrated in the timing diagrams of FIG. 5. In this embodiment, the number of groupings n is equal to three, such that there are three half-bridge assemblies connected to a respective output node 101 (e.g., all H1's to a first node, all H2's to a second node, and all H3's to a third node) to provide a PWM output (e.g., output A, B or C) to a respective phase winding 90 of a three-phase BLDC motor 10.

As illustrated in FIG. 5, the first and second switching elements 70 of each grouping are operated in the same manner as previously described for a single half-bridge assembly 60 in FIG. 4, where $f_s$ is the operating frequency of each switching element 70. However, in this exemplary embodiment, the switching elements of each grouping are staggered in time relative to the switching elements in the other groupings, as indicated in timing diagrams a through f. As a result, the composite frequency $f_p$, as shown in timing diagram g, generated from the combination of three half-bridge assemblies 60 being connected to a single phase winding 90, is generally equal to $n \times f_s$, or in this embodiment, $f_p = 3 \times f_s$. Therefore, if IGBT's are used as switching elements for this exemplary embodiment of three groupings, a maximum frequency of approximately (3×20)= 60 kHz can be achieved.

In general, the efficiency of a typical switching element can be increased if it is operated below its maximum frequency. As such, a driver with a plurality of groupings of half-bridge assemblies can be operated below the maximum switching frequency of its switching elements while still achieving a higher composite output frequency, since the output frequency is typically the product of the switching element operating frequency and the number of groupings. Accordingly, the exemplary embodiments of FIGS. 2 and 3 can be used for both frequency scaling and for efficiency improvement.

Figure 6:
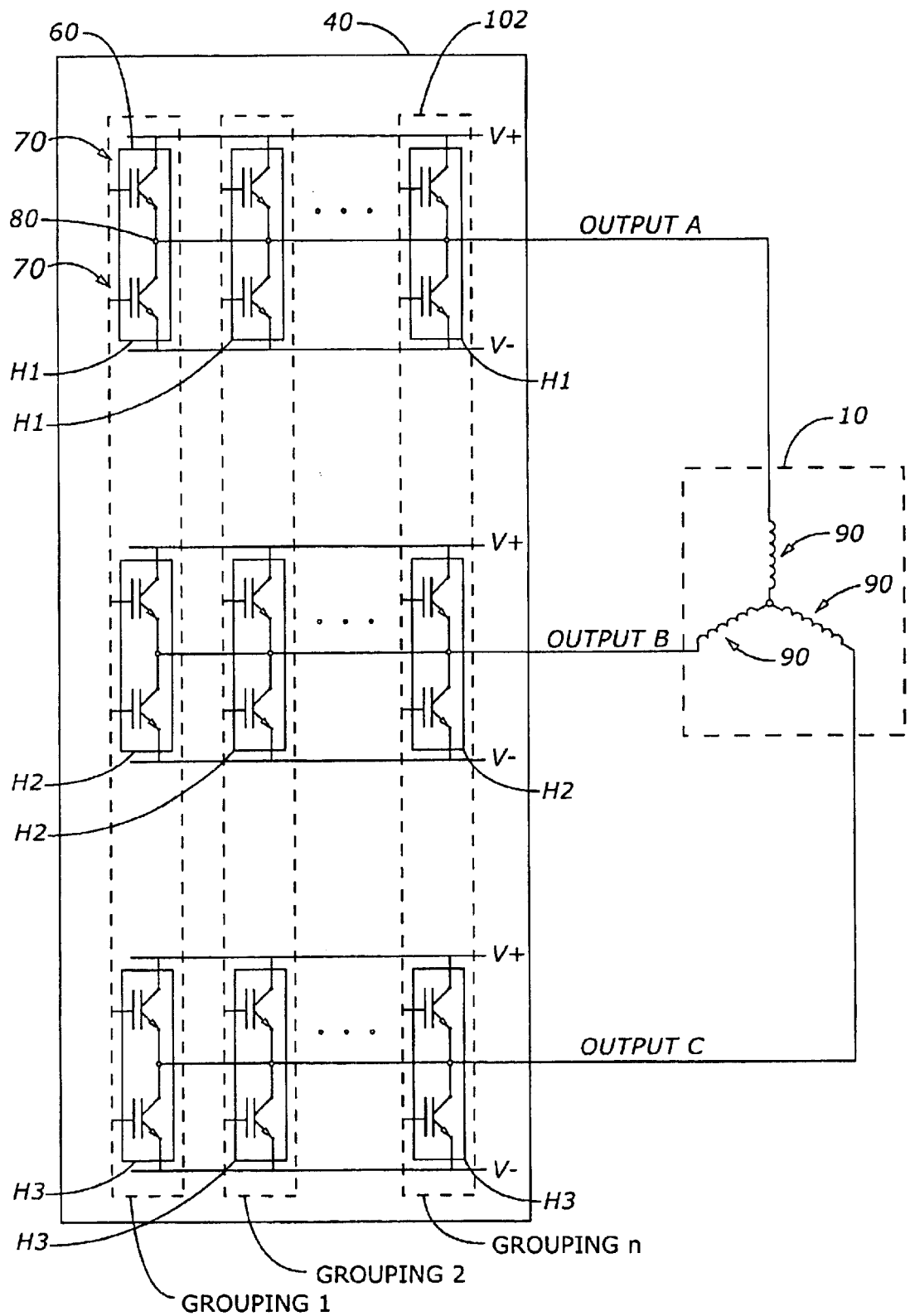
FIG. 6 is a schematic diagram of an alternate exemplary switching element configuration for a BLDC motor drive assembly.
Figure 7:
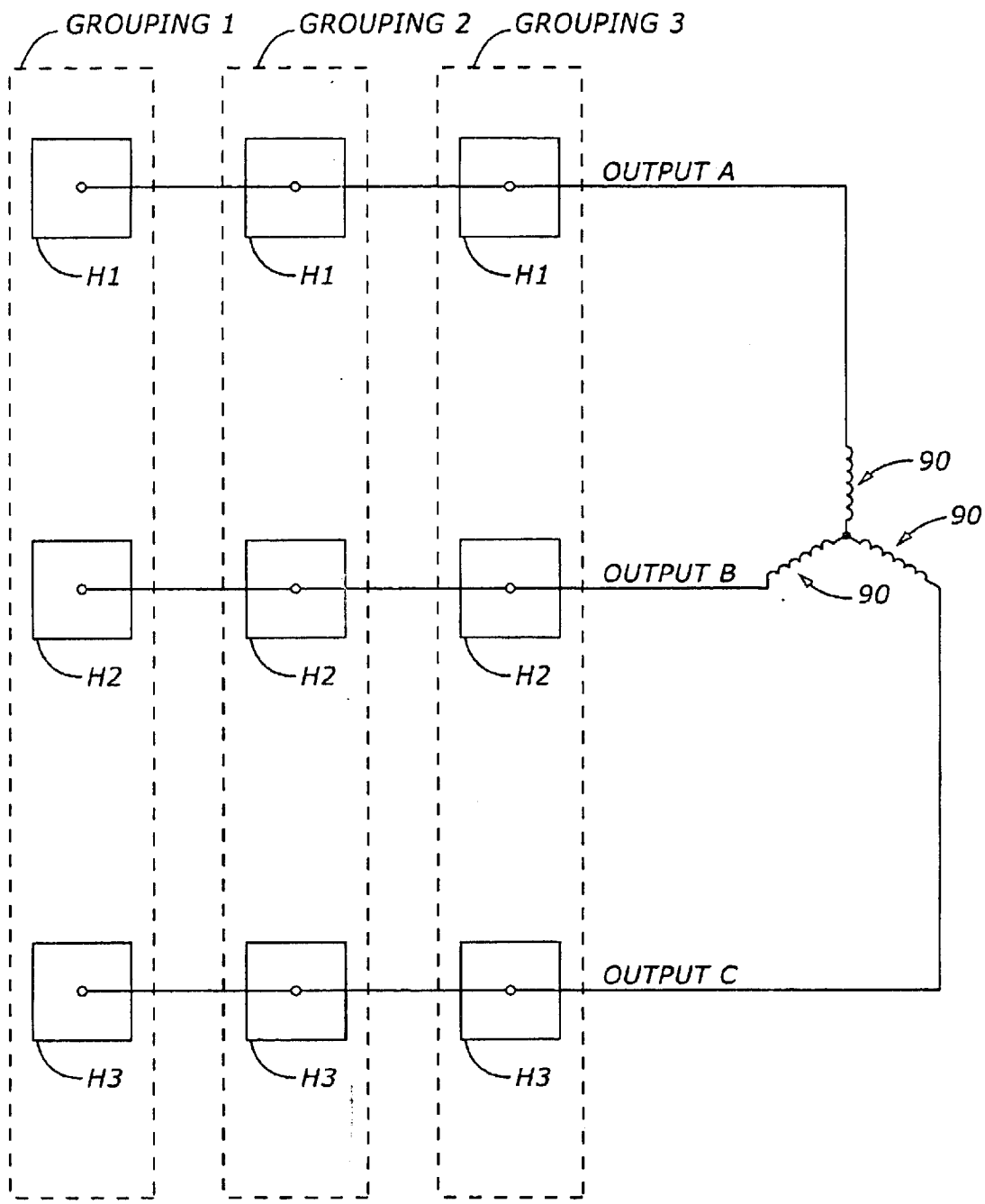
FIG. 7 is a simplified block diagram of the exemplary configuration of FIG. 6.

Another alternative exemplary embodiment of a plurality of half-bridge assemblies 60 is shown schematically in FIG. 6. In this embodiment, each half-bridge assembly 60 connected to the same output (A B or C) belongs to a different grouping 102. That is, the three H-1 assemblies are all connected to output A, but are each configured within a different grouping (1, 2, . . . n). In this embodiment, n=3, to correspond with the number of phase windings 90. In similar fashion, all H-2 assemblies are connected to output B, and all H-3 assemblies are connected to output C. This same configuration is shown in simplified block diagram form in FIG. 7, where three half-bridge assemblies H-1 are connected to phase winding 90 at output A, three half-bridge assemblies H-2 are connected to phase windings 90 at output B, and three half-bridge assemblies H-3 are connected to phase winding 90 at output C. Groupings 1, 2 and 3 are configured as in FIG. 6, with each grouping containing three half-bridge assemblies (H-1, H-2, H-3).

It should be noted that the exemplary embodiments disclosed herein are merely illustrative of various methods of arranging the half-bridge assemblies according to various embodiments of the present invention. In this regard, the half-bridge assemblies can be physically located in any one of a number of different manners with respect to one another, without departing from the spirit and scope of the present invention. Moreover, various multiple half-bridge assembly configurations are available commercially, such as the model 4357 3-phase motor drive including three half-bridge assemblies, manufactured by M.S. Kennedy Corp. of Liverpool, N.Y.

The exemplary embodiments of pluralities of half-bridge assemblies previously described herein are configured to achieve frequency scaling, but their power capability is still limited to that of a single half-bridge assembly switching element. Therefore, to meet the desired objectives of frequency and power scaling, additional half-bridge assemblies can be combined in power sharing configurations to achieve both frequency and power scaling.

Figure 8:
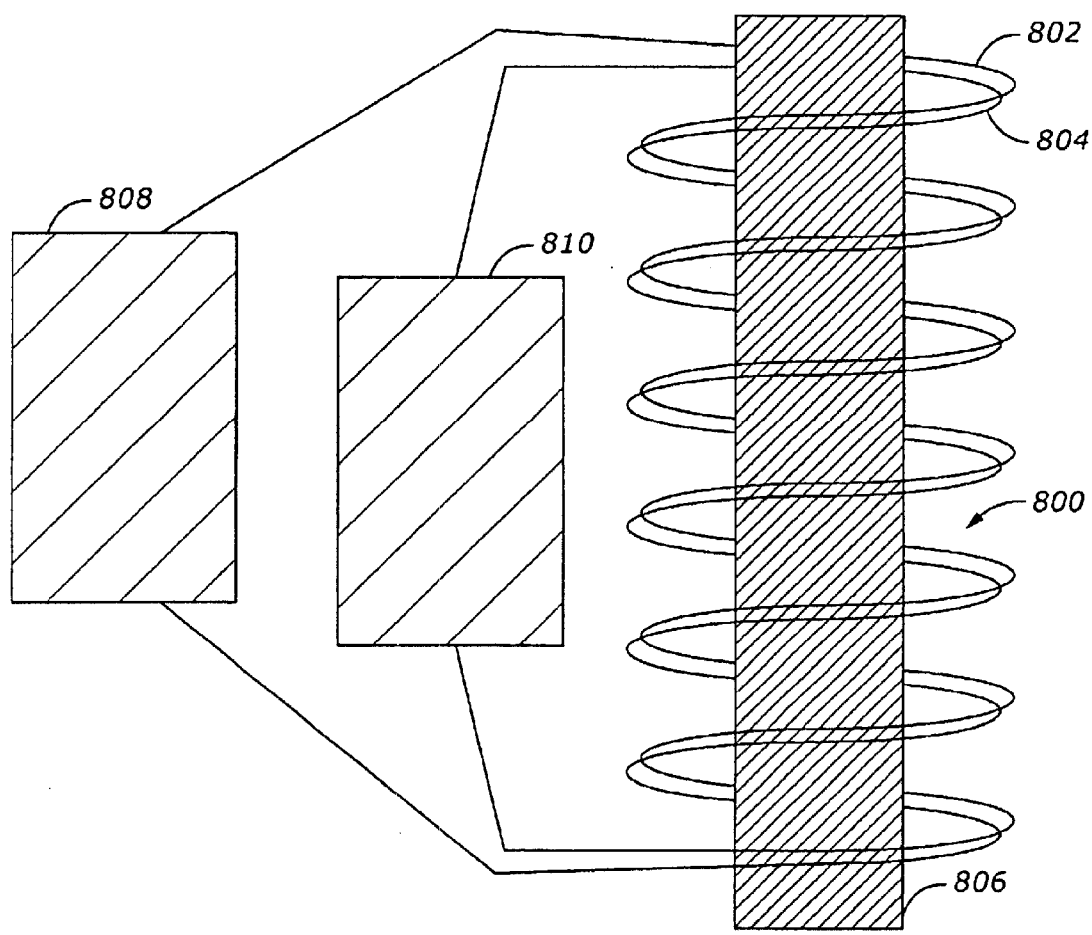
FIG. 8 is a schematic diagram of a "Two-In-Hand Winding" configuration.

One exemplary embodiment for power sharing is based on the technique known as "In-Hand" winding, which is illustrated in FIG. 8. In this example, two essentially identical coils (802, 804) are wound on a common core 806 to form a "Two-In-Hand" phase winding 800, which can represent one phase winding of a poly-phase BLDC motor. The term "In-Hand" derives from the typical practice of winding these coils by hand, in order to ensure their equal sharing of the electromagnetic field developed in the phase winding 800 when current flows through the coils 802, 804. Each coil is separately connected to one or more half-bridge assemblies, depending on the particular configuration of the motor drive assembly. In the FIG. 8 illustration, only one half-bridge assembly (808, 810) is connected to each coil (802, 804, respectively), but other configurations may include multiple combinations of half-bridge assemblies, as will be further described below.

Exemplary half-bridge assemblies 808 and 810 are typically activated in tandem by a controller (not shown) in order to combine their current generating capabilities in coils 802 and 804. The resulting electromagnetic field that is generated in phase winding 800 has the effect of forcing an equalization of the amount of current flowing in each of the coils 802, 804. This type of forced current sharing tends to act as an equalizing current control on each half-bridge assembly 808, 810, even though their voltage outputs may be somewhat unequal due to minor differences' in their respective operating characteristics. Thus, by "paralleling" the currents of half-bridge assemblies 808 and 810 in coils 802 and 804 of phase winding 800, an effective doubling of current capability can be realized.

Figure 9:
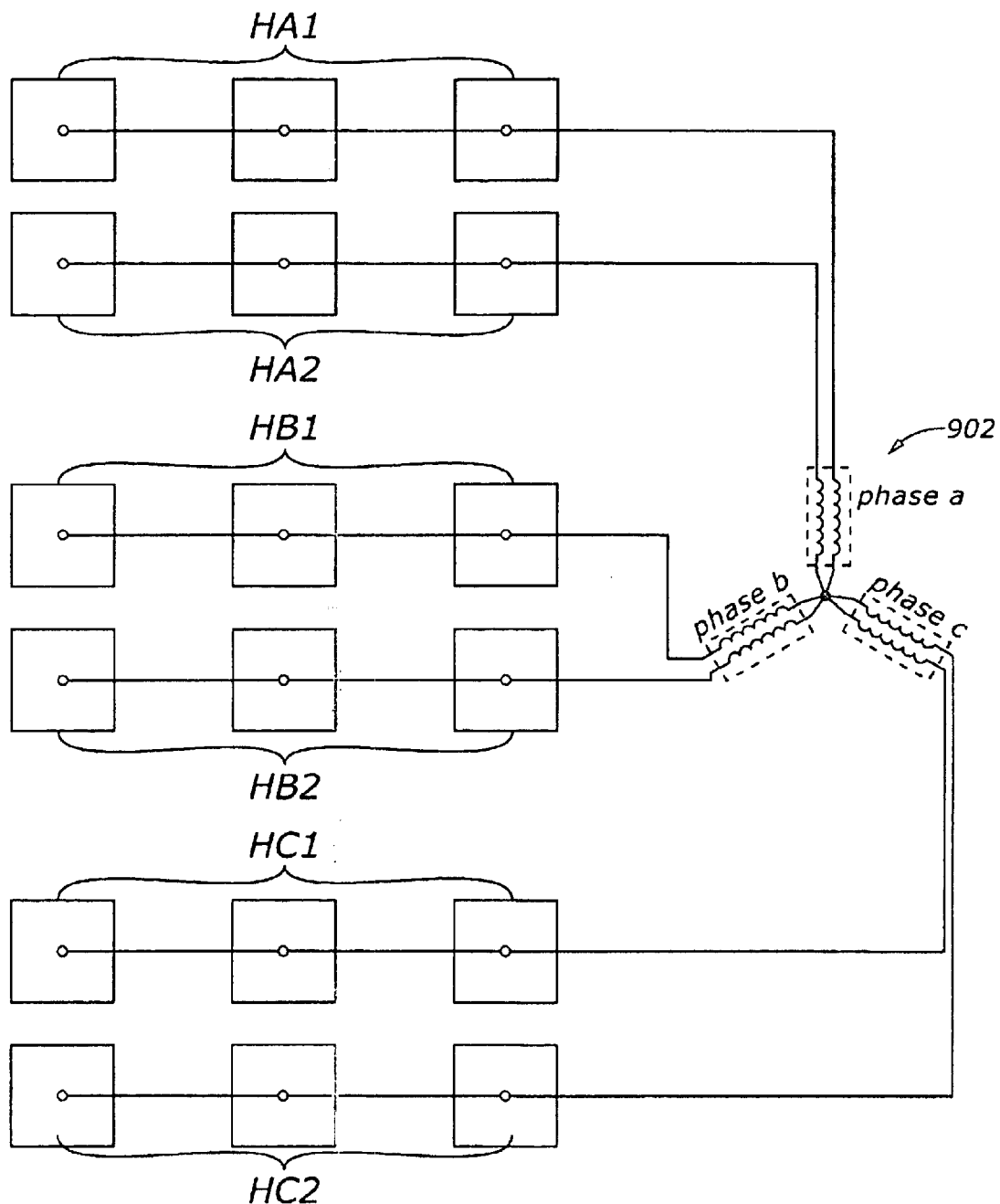
FIG. 9 is a block diagram of an exemplary "IN_HAND" wound BLDC motor drive assembly configuration.

The concept of "In-Hand" winding can be applied to a poly-phase motor, such as the three-phase configuration 902 shown in FIG. 9. In this exemplary embodiment, power scaling can be achieved by paralleling pairs of half-bridge assemblies connected to respective "Two-In-Hand" windings for each of the three phases. In the exemplary arrangement of FIG. 9, three half-bridge assemblies HA1 are connected to one of the "Two-In-Hand" windings on phase A, and three half-bridge assemblies HA2 are connected to the other "Two-In-Hand" winding on phase A. In similar fashion, half-bridge assemblies HB1 and HB2 are connected to their respective "Two-In-Hand" windings on phase B, and half-bridge assemblies HC1 and HC2 are connected to their respective "Two-In-Hand" windings on phase C.

In a typical operational embodiment, the three half-bridges HA1 are sequentially activated to produce an output current to the corresponding In-Hand winding of phase A at a frequency approximately three times the operating frequency of each half-bridge HA1, as previously described in the timing diagram of FIG. S. The three half-bridges HA2 are activated in synchronism with the three half-bridges HA1 to produce an essentially identical output current to the other In-Hand winding of phase A, with regard to both frequency and amplitude. As such, the combined outputs of three half-bridges HA1 and three half-bridges HA2 provide an electromagnetic field to phase A that is scaled upward in both frequency and power.

In similar fashion, half-bridge assemblies HB1 and HB2 provide scaled frequency and power to phase B, and half-bridge assemblies HC1 and HC2 provide scaled frequency and power to phase C. The drive signals for the 18 half-bridge assemblies in this exemplary embodiment are generated by a processor, such as processing element 50 in FIG. 1, and can be distributed to the half-bridge assemblies via a device such as a Field Programmable Gate Array (FPGA), which is not shown for clarity. As stated previously, other embodiments of half-bridge assemblies and phase windings can be configured in various ways without departing from the spirit and scope of the present invention.

Accordingly, the shortcomings of the prior art have been overcome by providing an improved method and apparatus for scaling both frequency and power capabilities of a controller for BLDC motors. Sequential triggering of a plurality of half-bridge assemblies enables frequency scaling, and paralleling half-bridge assembly drivers connected to respective multiple phase windings enables power scaling as well. The disclosed exemplary frequency and power sharing techniques allow the use of standard low-cost components for the switching elements, and also enable the switching elements to operate at relatively high efficiencies.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of scaling a drive assembly having half-bridge assemblies for controlling a brushless direct current (BLDC) motor with a predetermined number of phase windings, comprising the steps of:

sequentially activating a plurality of the half-bridge assemblies in a grouping to generate an output signal to a respective one of the phase windings at a frequency greater than the frequency capability of a single one of the half-bridge assemblies; combining multiple half-bridge assembly groupings to generate a level of drive current into respective phase windings that is greater than the current capability of a single one of the half-bridge assembly groupings; and equalizing the current share in each of the half-bridge assembly groupings by forcing current sharing in the respective phase windings.

2. The method of claim 1 wherein the equalized current sharing in the half-bridge assembly groupings is forced through the use of corresponding In-Hand phase windings.

3. A control system for driving a brushless direct current (BLDC) motor having a predetermined number of phase windings, comprising:

a drive assembly in electrical communication with the phase windings of the BLDC motor, the drive assembly comprising a plurality of half-bridge assembly groupings, each half-bridge assembly grouping being comprised of a plurality of half-bridge assemblies, each having switching elements capable of operating at a first frequency and at a first current level;

a processor in electrical communication with the drive assembly, the processor configured to control the operation of the switching elements in the half-bridge assemblies, wherein each grouping of the half-bridge assemblies is configured to generate pulse-width-modulated signals into a respective phase winding at a second frequency that is higher than the first frequency; and a plurality of the half-bridge assembly groupings configured to generate a second current level in their corresponding phase windings that is greater than the first current level.

4. The control system of claim 3 wherein the second frequency is equal to the product of the first frequency and the number of half-bridge assemblies in a grouping electrically connected to a respective phase winding.

5. The control system of claim 4 wherein the second current level is equal to the product of the first current level and the number of groupings of half-bridge assemblies in electrical communication with a corresponding phase winding.

6. The control system of claim 5 wherein the phase windings are configured as multiple In-Hand windings to force approximately equal current sharing between the corresponding switching elements of their respective half-bridge assemblies.

7. The control system of claim 6 wherein the In-Hand windings comprise two or more approximately identical coils wrapped around the same core.

8. The control system of claim 6 wherein the switching elements comprise insulated gate bipolar transistors (IGBT's).

9. A drive assembly for providing a pulse-width-modulated input voltage to a brushless direct current (BLDC) motor, wherein the drive assembly comprises a plurality of half-bridge assemblies that each include two switching elements that are each capable of operating at no more than a predetermined frequency and a predetermined current level, wherein at least two half-bridge assemblies are electrically connected to each phase winding of the BLDC motor, such that the at least two half-bridge assemblies are capable of providing a pulse-width-modulated input voltage to the respective phase winding of the BLDC motor at a frequency higher than the predetermined frequency, and wherein multiple groups of half-bridge assemblies are in electrical communication with corresponding phase windings of the BLDC motor, such that the multiple groups of half-bridge assemblies are capable of providing a combined current level to respective phase windings of the BLDC motor that is greater than the predetermined current level.

10. The drive assembly of claim 9 wherein the switching elements comprise insulated gate bipolar transistors (IGBT's).

11. The drive assembly of claim 9 wherein the switching elements of the plurality of half-bridge assemblies are each capable of operating at an operating frequency that is less than the predetermined frequency, wherein the at least two half-bridge assemblies that are electrically connected to respective phase windings of the BLDC motor are capable of providing the pulse-width-modulated input voltage to the respective phase windings of the BLDC motor at a frequency equal to the product of the number of half-bridge assemblies electrically connected to the respective phase windings and the operating frequency.

12. The drive assembly of claim 9 wherein the phase windings of the BLDC motor are configured as multiple In-Hand windings to force approximately equal current sharing between the corresponding switching elements of the respective multiple groupings of half bridge assemblies.

13. The drive assembly of claim 12 wherein the In-Hand windings comprise two or more approximately identical coils wrapped around the same core.

14. The drive assembly of claim 13 wherein the combined current level is equal to the product of the predetermined current level and the number of multiple groupings of half-bridge assemblies in electrical communication with a corresponding phase winding.

* * * * *